Patented Sept. 20, 1949

2,482,331

UNITED STATES PATENT OFFICE 2,482,331

COMPOSITION FOR INCREASING THE ADHESIVE POWER OF BITUMENS AND TARS

Robert Dupas, Clichy, France, assignor to Standard Oil Development Company, New York, N. Y., a corporate body No Drawing. Application March 12, 1947, Serial No. 734,234. In France June 21, 1941

Section 1, Public Law 690, August 8, 1946
Patent expires June 21, 1961

7 Claims. (Cl. 106—281)

The present invention relates to the improvement of the adhesive power of bituminous binders, coal tar, shale tar and the like to materials in general, and more particularly to road making materials.

It is known that although hydrocarbon binders such as bitumen, tar, and the like adhere satisfactorily to dry materials, they only adhere with difficulty to damp materials particularly if such materials are acid, such as flint, quartzite, and the like.

It is therefore necessary preferably to work in fine weather, since if a shower of rain occurs immediately after the formation of the surface it more or less completely washes the material which is thus deprived of its binding film.

Furthermore, throughout the life of the surface, water remains a very important disintegrating factor.

In order to remedy this lack of adhesiveness, it has already been proposed to add to the binder small percentages of compounds such as soaps or polyvalent metal phenolates, as described, for example, in French Patent No. 826,789 of September 15, 1937. It has also been proposed to add to the binder small percentages of organic bases (amines, pyridines and the like) as described, for example, in French Patent No. 847,829.

The amine bases proposed in this latter French patent are amine bases of high molecular weight having a long aliphatic chain; such bases are at present very rare on the market and difficult to procure.

The applicant has observed that polyvalent metal salts which are soluble in water produce practically no improvement in the adhesiveness of the binders when they are mixed alone with said binders in small proportions, but that on the other hand such salts produce a substantial improvement when they are in the presence of organic bases of high molecular weight which are capable of forming complexes of association. Very often such organic bases have a certain comparatively small natural activity which can be increased tenfold by the formation of a complex of association with a polyvalent metal salt such for example as zinc chloride. Now, it is well known that such complexes are readily formed in an aqueous medium. In order to prepare these complexes, to an aqueous colloidal dispersion of a chlorhydrate of organic bases of high molecular weight is added a solution of a polyvalent metal salt. It has been found that the best results are obtained with polyvalent metal chlorides such as zinc chloride, ferric chloride, and the like. In this manner complexes comprising amino bases and a polyvalent metal chloride are obtained in the form of a precipitate which is separated from the mother liquor, and such complexes may contain from 1 to 3 molecules of polyvalent metal chloride to three molecules of amine hydrochloride of high molecular weight.

By way of example, the following complexes have been prepared:

Methylene blue hydrochloride—zinc chloride
Rhodamine hydrochloride—aluminum chloride
Malachite hydrochloride—ferric chloride In general, the amino bases which are most suitable for the formation of such complexes are amino bases of high molecular weight containing several aromatic nuclei but no long aliphatic chains, and which produce colloidal dispersions in water, such as basic dyes, methylene blue, malachite green, rhodamines, rosamines, auramines, and the like.

With regard to the amines of high molecular weight having long aliphatic chains, such as heptadecylamine, heptadecylpyridine, the hydrochlorides of which are substantially insoluble, they are not capable of forming such advantageous complexes, such organic bases moreover already have a particularly high natural activity (about ten times higher than that of lead oleate), whereas the amino bases containing several aromatic nuclei on which there are only a small number of very short side chains such as those amino bases of which some have been mentioned hereinbefore by way of example, readily produce colloidal dispersions in water and are capable of forming complexes with polyvalent metal salts. These complexes when mixed in small proportions with binders impart to same as high an activity as that produced by the use of long aliphatic chain amines, as described in French Patent No. 847,829, whereas only a slight, and even no improvement is observed by using one of the components of the complex separately.

The amines with several aromatic nuclei without long aliphatic chains, which are proposed by the present invention, in association with a polyvalent metal chloride, are much less rare than the amino bases proposed in French Patent No. 847,829 and are commonly found on the market.

The present invention therefore has for its object to add to the binders small percentages of the complexes hereinbefore mentioned in order to improve the adhesiveness on contact with the materials. Fluid bitumens, tars, emulsions of bitumen or tar, can be directly improved by adding 0.1 to 1% of said complexes. It is however preferable to pre-coat the material with a comparatively small quantity of fluid bitumen or tar containing a higher proportion of complex and then add the remainder of the binder in the usual form: fluid bitumen, tar, bitumen or tar emulsion, according to the pre-coating method described in French Patents Nos. 826,789 and 847,829. In this case, the pre-coating binder may contain from 1 to 5 or even 10% and more of one of said complexes.

The following laboratory tests have been adopted in order to determine the improvement produced in the adhesive power by adding the above-mentioned complexes:

1. *Process without pre-coating.*—Comparison has been made of a cut-back (fluid bitumen) prepared with 40% of kerosene and 60% of asphalt having a penetration of 180-200 at 25° C. and containing 1% by weight of lead oleate, with a cut-back of the same nature but in which the lead oleate had been replaced by a complex comprising an amine and a polyvalent metal salt, for example the complex comprising methylene blue hydrochloride and zinc chloride.

Having introduced 20 gm. of gravel (1.2 to 4 mm.) into a test tube containing 50 gm. of water and 5 gm. of cut-back to be compared, agitation was effected for 30 seconds in a shaking machine.

By using the "methylene blue hydrochloride—zinc chloride" complex in a proportion of 0.1%, the gravel was coated in just as satisfactory a manner in the presence of water as in the case of the cut-back containing 1% of lead oleate.

2. *Process with pre-coating.*—150 gm. of moist materials (dimensions 5 to 15 mm.) are pre-coated with 2 gm. of a fluid cut-back containing the adhesivity agent. The coating is then completed with 5 gm. of bitumen, tar or emulsion.

With 2% of the "methylene blue chlorhydrate—zinc chloride" complex, just as satisfactory results were obtained as with 15% of lead oleate.

With the "malachite green hydrochloride—ferric chloride" complex, similar results were obtained.

Slightly less satisfactory results were obtained, but nevertheless satisfactory, with the "rhodamine hydrochloride—aluminum chloride" complex.

The examples which are given above in order to make the invention more clearly understood are in no way limitative. All the complexes obtained by precipitation of an amino salt and a polyvalent metal salt: iron, manganese, zinc, copper, aluminum, lead, and so forth, produce similar results.

I claim:

1. A bituminous composition of improved adhesive power which consists essentially of a bitumen having incorporated therein from 0.1 to 10% of a complex compound of a polyvalent metal chloride and an organic dyestuff containing a basic group selected from the group consisting of methylene blue hydrochloride, rhodamine hydrochloride and malachite green hydrochloride.

2. A composition according to claim 1 in which the polyvalent metal chloride is zinc chloride.

3. The composition defined by claim 1 in which the polyvalent metal chloride is aluminum chloride.

4. The composition defined by claim 1 in which the polyvalent metal chloride is ferric chloride.

5. A bituminous composition of improved adhesive power consisting essentially of a bitumen containing from 0.1 to 10% of a complex consisting of methylene blue hydrochloride and a polyvalent metal chloride.

6. A bituminous composition of improved adhesive power consisting essentially of a bitumen containing from 0.1 to 10% of a complex consisting of malachite green hydrochloride and a polyvalent metal chloride.

7. A bituminous composition of improved adhesive power consisting essentially of a bitumen containing from 0.1 to 10% of a complex consisting of rhodamine hydrochloride and a polyvalent metal chloride.

ROBERT DUPAS.

REFERENCES CITED

The following references are of record in the file of this patent:

UNITED STATES PATENTS

| Number | Name | Date |
| --- | --- | --- |
| 1,772,522 | Rodd et al. | Aug. 12, 1930 |
| 2,191,295 | Dohse | Feb. 20, 1940 |

FOREIGN PATENTS

| Number | Country | Date |
| --- | --- | --- |
| 847,829 | France | July 10, 1939 |